United States Patent [19]

Schoenberg

[11] Patent Number: 5,530,073
[45] Date of Patent: Jun. 25, 1996

[54] PROCESS FOR INCREASED PEROXIDE EFFICIENCY IN CONTROLLED RHEOLOGY POLYPROPYLENE RESIN

[75] Inventor: Morris R. Schoenberg, Naperville, Ill.

[73] Assignee: Amoco Corporation, Chicago, Ill.

[21] Appl. No.: 497,260

[22] Filed: Jun. 30, 1995

[51] Int. Cl.$^6$ .................................................. C08F 8/50
[52] U.S. Cl. ...................... 525/345; 525/333.8; 525/333.9
[58] Field of Search ................................................ 525/345

[56] References Cited

U.S. PATENT DOCUMENTS

| | | | |
|---|---|---|---|
| 4,552,930 | 11/1985 | Hirota et al. | 525/333.8 |
| 4,578,430 | 3/1986 | Davison | 525/333.8 |
| 4,624,993 | 11/1986 | Upadhyaya | 525/333.8 |
| 5,006,608 | 4/1991 | Gardiner et al. | 525/333.8 |
| 5,231,144 | 7/1993 | Yamamoto et al. | 525/333.8 |
| 5,246,779 | 9/1993 | Heimberg et al. | 525/387 |

*Primary Examiner*—Bernard Lipman
*Attorney, Agent, or Firm*—Ronald S. Courtney; Wallace L. Oliver

[57] ABSTRACT

This invention relates to a peroxide process for preparation of controlled rheology polypropylene resins wherein 2,5-dimethyl-2,5-bis(t-butylperoxy)hexane is the peroxide and the melt flow rate is increased by the presence of a thioester of the general formula $$(C_nH_{2n+1}-O-\overset{\overset{\displaystyle O}{\|}}{C}CH_2CH_2)_2S,$$

wherein n is a whole number of from 6 to 16.

5 Claims, No Drawings

PROCESS FOR INCREASED PEROXIDE EFFICIENCY IN CONTROLLED RHEOLOGY POLYPROPYLENE RESIN

FIELD OF THE INVENTION

This invention relates to a new and useful process for increased peroxide efficiency in controlled rheology polypropylene resin. More particularly, this invention relates to a new and useful process for producing a higher melt flow rate polypropylene resin without exceeding a limit of 100 parts per million of tertiary butyl alcohol as a peroxide decomposition product by controlled degradation of polypropylene resin.

BACKGROUND OF THE INVENTION

Degradation of polypropylene polymer to a lower molecular weight and a narrower molecular weight distribution than the starting material has been termed as being the process of visbreaking a polyolefin. The resulting polypropylene exhibits improved flowability during the fabrication of finished plastic products. Although the process of visbreaking of polypropylene can and does occur naturally at appropriate temperatures, unstabilized polypropylene oxidizing rapidly at relatively low temperature, it is common practice in the art to induce and/or to accelerate the process by means of suitable chemical reagents to obtain a product of prescribed physical characteristics.

When organic peroxides are mixed with polypropylene in the melt phase, the polymer is caused to degrade to a lower molecular weight and exhibit a higher melt flow rate, wherein the presence of the organic peroxides in the polypropylene resin results in what is known as controlled rheology (CR) resin. The peroxide of choice in the polypropylene art in the production of CR polypropylene resins is 2,5-dimethyl-2,5-bis(t-butylperoxy) hexane, available from the ATOCHEM, Organic Peroxides Division, Buffalo, N.Y., as Lupersol 101. This peroxide, 2,5-dimethyl-2,5-bis(t-butylperoxy)hexane is also the only peroxide approved by the FDA for intentional peroxide degradation of polypropylene. Although CR polypropylene resins made with Lupersol 101 exhibit good processability, the controlled rheology process of these resins under conditions of heat with Lupersol 101 causes the production of tertiary butyl alcohol (TBA) as a decomposition by product. Government regulations limit the amount of TBA present in polypropylene resins or produced therefrom to 100 parts per million (ppm).

The reduction or elimination of tertiary butyl alcohol from CR polypropylene resins containing Lupersol 101 has been the subject of continuing study in the plastics industry. Other peroxides than 2.5-dimethyl 2,5-bis(t-butylperoxide)hexane are taught by Ehrig, et al., U.S. Pat. No. 4,707,524, which do not decompose to TBA and which have a half-life of from about 1.0 to 10 hrs at 128° C. The peroxides of choice by Ehrig '524 are 2,2 - di(t-aryl) peroxy propane and 3,6.6.9.9 pentamethyl-3-n-propyl-1,2,4,5 tetraoxacyclononane. Ehrig '524 notes that although tests indicate that at the same concentration Lupersol 101 is more effective in controlling comparable molecular weights than the peroxides chosen by Ehrig '524, the complete elimination of TBA makes it possible to increase the concentration of the other peroxides to obtain desired physical properties of the CR polypropylene resins.

However, the peroxides taught by Ehrig '524 merely avoid the problem of elimination or reduction of production of TBA during processing of CR polypropylene resins and can introduce other problems as to modifications of process conditions and CR polypropylene resin formulas which industry-wide are based upon use of Lupersol 101.

Fodor, et al., U.S. Pat. No. 5,017,661, teaches the use of strong acidic materials, such as acidic zeolites, for reducing the level of t-butyl alcohol produced during the visbreaking of polyolefins using peroxides capable of generating t-butyl alcohol. The strong acidic materials taught by Fodor '661 include strong inorganic acids such as nitric acid, sulfuric acid, and hydrochloric acid, as well as strong organic acids such as trichloroacetic acid, trifluoroacetic acid, fluorinated alkyl sulfonic acids, and aryl sulfonic acids. Preferred however are solid strong acidic materials such as acidic zeolites. The strong acidic materials are used at a temperature within the range of from about 170° C. to about 350° C. at amounts of from 4:1 to about 0.25:1 weight ratio of the acidic material to the peroxide.

It is uncertain whether the process of Fodor '661 is economically desirable considering adjustments to process conditions and equipment necessitated by the utilization of strong acidic materials. It is also uncertain how effective the utilization of strong acidic materials is in reducing and controlling the melt flow-rate of visbroken polypropylene resins even though the t-butyl alcohol content is reduced. For example, in Table 3, column 4, of Fodor '661, it is observed that the melt flow (MF) of resins treated with acidic molecular sieve is not significantly less than resins not reacted with acidic molecular sieve, 37 to 39 versus 42 at the same level of Lupersol 101, although the TBA content of the visbroken polypropylene resin is significantly reduced to 28 ppm from 66 ppm.

Accordingly, in the prior art the investigators have not dealt with the problem of increasing the melt flow rate of visbroken polypropylene with use of 2,5-dimethyl-2,5-bis(t-butylperoxy) hexane but have directed their attention to reducing the content of t-butyl alcohol in visbroken polypropylene.

It is therefore an object of this invention to provide a process for controlling and increasing the melt flow rate of visbroken polypropylene with use of 2,5-dimethyl-2,5 bis(t-butylperoxy) hexane.

It is a further object of this invention to provide a process for the production of controlled rheology polypropylene which permits and facilitates the continuous use of 2,5-dimethyl-2,5-bis(t-butylperoxy) hexane as the peroxide of choice for visbreaking polypropylene.

It is still further an object of this invention to provide a process for the production of controlled rheology polypropylene resins wherein FDA approved thioester compounds of the general structure of

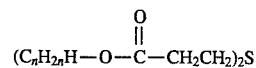

synergistically react with the FDA-approved peroxide consisting of 2,5 -dimethyl-2,5 bis(t-butylperoxy)-hexane to increase the melt flow index of controlled rheology polypropylene resins and maintain a maximum allowable level of t-butyl alcohol not greater than 100 parts per million.

SUMMARY OF THE INVENTION

This invention relates to a process for preparation of controlled rheology polypropylene resins which permits and facilitates the continuous use of 2,5 -dimethyl-2,5 bis(t-butylperoxy) hexane as the peroxide of choice wherein the maximum allowable level of t-butyl alcohol produced by decomposition of the 2,5-dimethyl-2,5 bis(t-butylperoxy) hexane is not greater than 100 ppm and the melt flow rate is increased by the presence of thioesters of the general formula

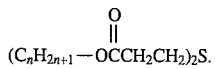

DETAILS OF THE INVENTION

This invention relates to a process for preparation of controlled rheology polypropylene resins wherein 2,5-dimethyl-2,5 bis(t-butylperoxy)hexane is the peroxide of choice in the presence of a thioester of the general formula

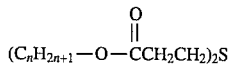

wherein n is a whole number of from 6 to 16.

The melt index of the controlled rheology polypropylene resin is increased by the presence of the thioester which facilitates the visbreaking process. The use of thioesters of the designated general formula have not been previously known for a synergistic reaction with 2,5-dimethyl-2,5 bis (t-butylperoxy) hexane to improve the visbreaking process of polyolefins by means of peroxides.

As is well-known, thermally induced homolytic decomposition of peroxides and hydroperoxides to free radicals increases the rate of oxidation. Decomposition to nonradical species removes hydroperoxides as potential sources of oxidation inhibitors. As is also well-known, synergistic combinations of phenolics and thioesters have been considered as a suitable antioxidant for polypropylene, see Kirk-Othmer, Encyclopedia of Chemical Technology, Vol. 3, p. 431, 4th Ed. and Vol. 3, p. 127, 3rd Ed.

It is therefore surprising and unexpected that a thioester of the general formula

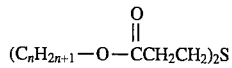

reacts in a synergistic method to improve the homolytic decomposition of the 2,5-dimethyl-2,5 bis(t-butylperoxy) hexane and thereby improve the melt flow rate of visbroken polypropylene resin.

Modification of polypropylene in the so-called "controlled rheology" process is taught in the prior art by the closely regulated addition of certain peroxides such as 2,5-dimethyl-2,5-di(t-butylperoxy) hexane. The peroxide typically is added in the extruder during pelletization after the polymerization process is complete. The peroxide tends to encourage a more-or-less uniform breakdown of the molecular structure of the polypropylene under the physical and thermal stress of the extruder, resulting in a product having a relatively narrow molecular weight distribution, the reduction in average molecular weight and the improved narrowness of the molecular weight distribution being typically accompanied by an increase in melt flow and a change in both rheology and physical properties as compared with those of a reactor product having a similar melt flow. This "controlled rheology" process is well-known in melt spinning fibers.

Melt-flow rate is measured normally according to the ASTM test D- 1238-89. In this test the rate of extrusion in grams per 10 minutes through an orifice 0.0825 inch in diameter and 0.315 inch in length is determined for polypropylene at a temperature of 230° C. under the weight of a piston having a diameter of 0.373 inch and weighing, in combination with its plunger, 2.160 grams.

The apparatus utilized for determining melt index in ASTM D 1238–89 is defined as a "dead weight piston plastometer."

Generally speaking, propylene from a reactor will have a melt flow rate (MFR) below 1, indicating a relatively high molecular weight. As produced, polypropylene typically has a weight average molecular weight in the range of from about 250,000 to 1,000,000 and a molecular weight distribution of from 4 to 15. For high speed spinning and fiber forming, the molecular weight distribution is preferably about 2.5 to 4.5 and the weight average molecular weight sufficiently low to reduce polymer viscosity. However, when the weight average molecular weight is less than about 130,000, the polypropylene resin cannot be processed easily into pellets. Degradation of polypropylene is therefore limited to produce a molecular weight greater than about 160,000.

Target melt flow rates for commercial end uses of polypropylene are determined according to the application. As taught in U.S. Pat. No. 3,898,209, for film grade resins the MFR should be about 4 to 9, preferably 6 to 8. For fiber grade resins, the MFR should be in the range from 20 to 50, preferably 25 to about 42. For extrusion grade resins competitive with low density polyethylene, the MFR should be 40 to 60, preferably 45 to 55.

Peroxide degradation of high weight average molecular weight using 2,5-dimethyl-2,5-bis(t-butyl-peroxy) hexane can result in a t-butyl alcohol content in the polypropylene resin, the content of the t-butyl alcohol being limited by FDA regulation to being not greater than 100 ppm.

Surprisingly, in the process of the instant invention, the addition of a thioester of the general formula

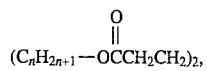

wherein n is a whole number of from 6 to 16, synergistically increases the melt flow rate of polypropylene in the presence of 2,5-dimethyl-2,5-bis(t-butyl-peroxy) hexane without causing an increase in the rate of concentration of t-butyl alcohol from degradation of the 2,5-dimethyl-2,5-bis(t-butyl-peroxy) hexane. Typical thioesters of the above general formulation suitable for the process of this invention include distearyl thiodipropionate (DSTDP), dilauryl thiodipropionate (DLTDP), dimyristyl thiodipropionate (DMTDP). Content of the typical thioesters for fiber grade resins is in the range of from 0.1 to about 0.4 percent by weight of the peroxide polypropylene formulation.

Content of the thioester utilized for controlled degradation of polypropylene resin in the presence of 2,5-dimethyl-2,5-bis(t-butylperoxy)hexane can be in the range of from about 0.001 to about 1.00 percent by weight of the peroxide polypropylene formulation. A content level below 0.001 percent by weight is considered to be of relative ineffectiveness in achieving controlled degradation of the polypropylene resin. A content level greater than 1.00 percent by weight is considered to be uneconomic and would tend to result in excessive degradation of the polypropylene resin to a molecular weight range less than about 160,000.

Target melt flow rates for commercial end uses of polypropylene in the presence of 2,5-dimethyl-2,5-bis(t-butylperoxy)hexane and a thioester of the structure formula

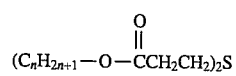

wherein n is a whole number of from 6 to 16 can be obtained by adjusting the amount of the thioester in the polypropylene/peroxide/thioester formulation. The amount of the thioester can be easily determined by preliminary experiments.

Although no explanation is offered for the synergism resulting from the conjoint presence of the thioester and the peroxide to cause a degradation of the weight average molecular weight and consequent increase in the melt flow rate of the polypropylene resin, presumably by an oxidative mechanism, it is noted that combinations of thioesters and phenolics have been considered as antioxidants for polypropylene in the prior art.

Accordingly, in the process of the instant invention, the peroxide, 2,5-dimethyl-2,5-bis(t-butylperoxy) hexane is added to polypropylene resin in one of several ways, i.e., in pellet form, or master-batched with polypropylene powder, or in pellet form in an amount such that the decomposition product of t-butyl alcohol from the peroxide does not exceed 100 ppm upon processing the resin pellets through an extruder. Such an amount will need to be determined experimentally, depending upon the weight average molecular weight of the reactor product. For many applications, concentration of the 2,5-dimethyl-2,5-bis(t-butylperoxy) hexane relative to the polypropylene resin will be in the range of from about 0.01 to about 0.4 weight percent of the weight of the polymer when the peroxide-containing polymer is 100% of the feed to the extruder, although other ranges of concentration may be found to be suitable, depending upon the final target melt flow rate. If the peroxide-containing pellets also contain additional components such as colors, extrusion lubricants, etc., the relative concentration of the peroxide and polypropylene resin will remain in the same range. The polypropylenes for which this invention is effective include copolymers containing ethylene within the FDA extractable limit.

Distearyl thiodipropionate (DSTPDP) is a typical thioester which can be added to a peroxide-polypropylene formulation to obtain a synergistic degradation of the weight average molecular weight to a lower weight average molecular weight and consequent increased melt flow rate/ narrow molecular weight distribution.

The utility of the process of the instant invention is illustrated by a projected increase in the maximum melt flow range of a commercial fiber resin, which has a maximum melt flow range of 33–43 in the presence of a peroxide comprising 2,5-dimethyl-2,5-bis(t-butyl-peroxy) hexane. This range cannot be increased due to the FDA limit on emission and polymer content of t-butyl alcohol. It is projected that addition of 0.4 wt % DSTDP would allow this range to increase by about 10 units to about 43–53 with no change in peroxide addition.

In accordance with the process of the present invention a polypropylene resin, the organic peroxide and the thioester can be charged to a blending zone. A blanket of an inert gas such as nitrogen, argon and the like is maintained within the blending zone by feeding the inert gas to said zone. The peroxide and thioester are uniformly blended with the polypropylene resin by means of an agitator, paddle, blade or the like within the blending zone. Although it is not considered strictly necessary to maintain the blending zone under an inert blanket, use of an inert gas is considered preferable for safety reasons. If desired, the blending of the polypropylene, peroxide and thioester can be effected upon admixture of the components during the extrusion operation.

The resulting peroxide/polypropylene/thioester blend can then be charged to the hopper of a high shear zone such as provided by an extruder. A condition of high shear is maintained within the extruder by heating the resin blend to a molten state with heating means associated with the extruder and working the melt in the annular zone between the extruder screw and the inner wall of the barrel of the extruder, as the melt passes through the extruder to the forming means or die which terminates the extruder. Thermal mechanical action of the extruder takes place at a temperature within the range of from about 150° C. to about 300° C.

The degraded polypropylene products of the present invention exhibit excellent extrudability and end use properties, especially fiber properties. Moreover, the products exhibit an extremely narrow molecular weight distribution, low peroxide odor and superior brightness and water whiteness. Melt flow rates can be raised in accordance with the present invention substantially above the initial melt flow rate of the feedstock.

The following procedures were utilized in the illustrative examples to illustrate the effect that the addition of a thioester to the polypropylene in the presence of 2,5-dimethyl-2,5-bis(t-butylperoxy)hexane has on the melt flow rate of the polypropylene. The rate of concentration of t-butyl alcohol from degradation of the 2,5-dimethyl-2,5-bis(t-butylperoxy)hexane did not increase.

All laboratory samples were blended by a bag shaking method and then compounded immediately to reduce the loss of any volatile components in the formulation.

In each sample a polypropylene reactor flake was obtained that had a melt index about 3. Lupersol 101, was added to the flake to a predetermined concentration and a homogeneous blend made by bag shaking.

The samples were then extruded in a 4-zone extruder at a screw speed of 120 rpm, under a nitrogen purge wherein temperatures of four zones were: zone 1—205° C.; zone 2—215° C.; zone 3—225° C.; zone 4—225 ° C. Residence time in the extruder is approximately 1 minute at 120 rpm. The extruded strand was pelletized by a rotary cutter. The polymer was easily pelletized and produced polymer pellets equivalent to normal commercial pellets.

The melt index of each sample was then determined using a melt indexer (ASTM 1238) operated at 230° C. and a 2.160 gram weight. Samples were allowed to heat to equilibrium for 5 minutes prior to testing. The melt index is equivalent to the grams exiting a 0.0825 inch diameter orifice in a period of 10 minutes.

The following illustrative examples further illustrate the present invention. Unless otherwise stated, all percentages and parts are by weight.

EXAMPLE 1

The following example illustrates the effect of increasing amounts of Lupersol 101 on the melt index of a polypropylene resin formulation. The samples were prepared as described in the above procedures. All formula data are in weight percents.

| Sample No. | 1 | 2 | 3 | 4 | 5 | 6 |
|---|---|---|---|---|---|---|
| Polypropylene Powder | 100.0 | 100.0 | 100.0 | 100.0 | 100.0 | 100.0 |
| Lupersol 101 | — | 0.02 | 0.04 | 0.05 | 0.06 | 0.07 |

-continued

| Sample No. | 1 | 2 | 3 | 4 | 5 | 6 |
|---|---|---|---|---|---|---|
| Powder MFR | 3.35 | 3.35 | 3.35 | 3.35 | 3.35 | 3.35 |
| Actual Pellet MFR | 3.43 | 12.54 | 23.54 | 29.60 | 37.44 | 46.4 |

The above data indicate addition of Lupersol 101 in amounts of up to 0.07 weight percent can increase the actual pellet MFR from a level of about 3.43 in the absence of Lupersol 101 to 46.4.

EXAMPLE 2

The following example illustrates the effect on the melt index to a peroxide-polypropylene resin formulation by the addition of distearyl thiodipropionate (DSTDP). The procedure of Example 1 was repeated. The MFR was increased to 73.80 in the presence of Lupersol 101. Details as to formulation and results are as follows.

| Sample No. | 1 | 2 | 3 | 4 | 5 | 6 |
|---|---|---|---|---|---|---|
| Polypropylene Powder | 100 | 100 | 100 | 100 | 100 | 100 |
| Lupersol 101 | — | 0.02 | 0.04 | 0.05 | 0.06 | 0.07 |
| DSTDP | 0.45 | 0.45 | 0.45 | 0.45 | 0.45 | 0.45 |
| Powder MFR | 3.35 | 3.35 | 3.35 | 3.35 | 3.35 | 3.35 |
| Actual Pellet MFR | 3.33 | 19.94 | 40.00 | 48.78 | 65.16 | 73.80 |

EXAMPLE 3

The procedure of Example 2 was repeated but the amount of Lupersol 101 was held constant and the amount of DSTDP was increased. The data indicate that an increase in concentration of DSTDP relative to a constant level of concentration of Lupersol 101 does not increase the MFR proportionately. The increase in MFR accordingly is dependent upon the synergism due to presence of both DSTDP and Lupersol 101. Details as to formulation and results are as follows.

| Sample No. | 1 | 2 | 3 | 4 | 5 | 6 |
|---|---|---|---|---|---|---|
| Polypropylene Powder | 100 | 100 | 100 | 100 | 100 | 100 |
| Lupersol 101 | 0.04 | 0.04 | 0.04 | 0.04 | 0.04 | 0.04 |
| DSTDP | — | 0.01 | 0.05 | 0.10 | 0.20 | 0.40 |
| Powder MFR | 3.35 | 3.35 | 3.35 | 3.35 | 3.35 | 3.35 |
| Actual Pellet MFR | 22.60 | 22.99 | 24.31 | 25.57 | 27.07 | 33.42 |

EXAMPLE 4

The procedure of Example 2 was repeated with the substitution of dimyristyl thiodipropionate (DMTDP). Molar concentration of DMTDP was equivalent to the concentration of DSTDP in Example 3. Details as to formulation and results are as follows.

| Sample No. | 1 | 2 | 3 | 4 | 5 | 6 |
|---|---|---|---|---|---|---|
| Polypropylene Powder | 100 | 100 | 100 | 100 | 100 | 100 |
| Lupersol 101 | 0.04 | 0.04 | 0.04 | 0.04 | 0.04 | 0.04 |
| DMTDP | — | 0.01 | 0.05 | 0.10 | 0.20 | 0.40 |
| Powder MFR | 3.35 | 3.35 | 3.35 | 3.35 | 3.35 | 3.35 |
| Actual Pellet MFR | 22.68 | 23.15 | 23.96 | 26.13 | 29.44 | 36.00 |

On a molar basis, DSTDP from example 3 and DLTDP from Example 4 have the identical effect on Lupersol activity.

That which is claimed is:

1. A process for preparation of a controlled rheology polypropylene resin by controlled degradation of polypropylene polymer in the presence of 2,5-dimethyl-2,5-bis(t-butylperoxy)hexane in an amount of not greater than 100 parts per million and a thioester of the structural formula

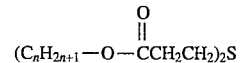

wherein n is a whole number from 6 to 16 in an amount of from 0.001 to about 1.00 percent by weight of the 2,5-dimethyl- 2,5-bis(t-butylperoxy)hexane-polypropylene formulation wherein said process comprises admixing said thioester with said hexane-polypropylene formulation to form a mixture, melting the mixture under thermal mechanical action and forming a solid polypropylene product wherein the melt flow index of the controlled rheology polypropylene resins is increased without exceeding a limit of 100 parts per million of tertiary butyl alcohol as a peroxide decomposition product.

2. The process of claim 1 wherein said thermal mechanical action takes place at a temperature within the range of from about 150° C. to about 300° C.

3. The process of claim 1 wherein said thioester is distearyl thiodipropionate.

4. The process of claim 1 wherein said thioester is dilauryl thiodipropionate.

5. The process of claim 1 wherein said thioester is dimyristyl thiodipropionate.

* * * * *